Oct. 14, 1952 — C. J. RUPPERT — 2,613,722
SADDLE COVER
Filed July 1, 1949 — 2 SHEETS—SHEET 1

INVENTOR.
CLARENCE J. RUPPERT
BY Raymond N. Matson
AGENT

Oct. 14, 1952        C. J. RUPPERT        2,613,722
SADDLE COVER
Filed July 1, 1949                                2 SHEETS—SHEET 2
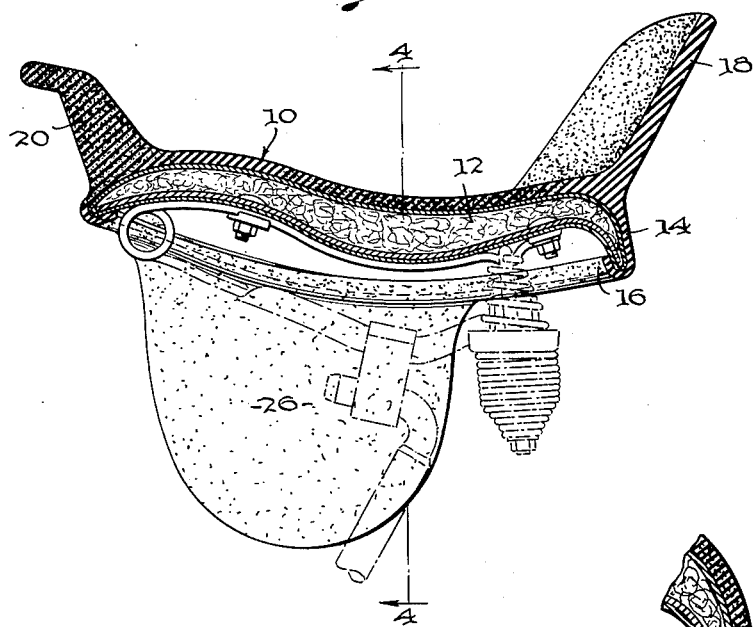
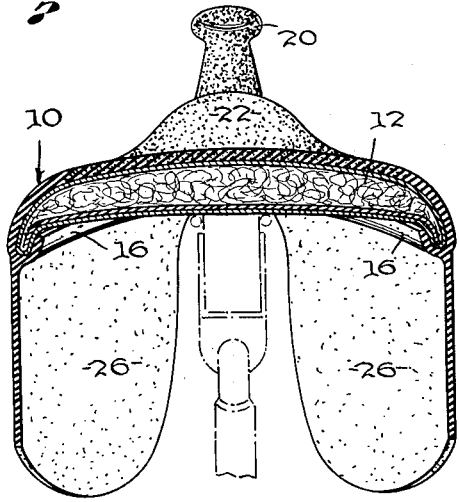
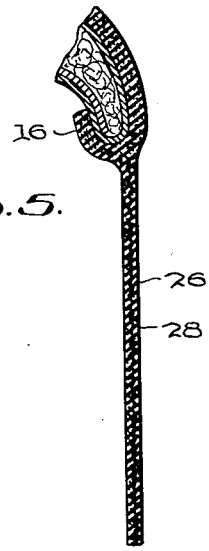
INVENTOR.
CLARENCE J. RUPPERT
BY
Raymond R. Matson
AGENT Patented Oct. 14, 1952

2,613,722

UNITED STATES PATENT OFFICE 2,613,722

SADDLE COVER

Clarence J. Ruppert, Washington, D. C., assignor of thirty-three and one-third per cent to Eli W. Gaffield, Washington, D. C., and thirty-three and one-third per cent to Raymond N. Matson, Silver Spring, Md.

Application July 1, 1949, Serial No. 102,693

10 Claims. (Cl. 155—5.23)

This invention relates generally to cycle seat covers and more particularly to readily removable seat covers for children's velocipedes of all types.

Saddle covers are well known in the art and, in general, have been provided for their cushioning, wear-preventing or weatherproofing characteristics, no consideration being given to making the riders seat more secure or safer during operation of the velocipede.

When a child rider collides directly or at an angle with another rider or with an object such as a curb, he or she is thrown forwardly against the handle-bar post or one of the ends of the handle-bars is deflected so as to swing around and strike the child in the body. In either event, the child is subject to possibly serious injury. Other injuries are also suffered by children as a result of losing their seat and falling from the velocipede when encountering uneven spots in the roadway while riding carelessly or at too rapid a rate.

Accordingly, the chief object of the present invention is to provide a seat cover for children's velocipedes which will have all of the advantages of known seat covers and in addition, provide a more secure seat for the child while affording it means for avoiding injuries resulting from falls or collisions.

Another important object of the present invention is to provide a flexible cover for the saddle of children's velocipedes which may be readily applied to or removed from the conventional saddle.

A further important object of the invention is to provide a flexible cover for the saddle of children's velocipedes which will so change the contours of the saddle as to provide a secure seat for the rider as well as a safety projection or hand-hold enabling him to instantly dismount from the velocipede or have a collision cushioned.

A still further important object of the invention is to provide a composite rubber saddle cover having relatively hard and soft portions so as to afford a maximum of safety, comfort and wear.

Another object of the present invention is to provide a novel, attractive cover for saddles which is susceptible of ready and economical manufacture and which will be rugged and of long life in use.

Other objects and advantages of the invention will become apparent during the course of the following description.

In the drawings, I have shown two embodiments of the invention. In this showing:

Figure 3 is a central vertical longitudinal sectional view of the invention showing it in position on a velocipede seat;

Figure 4 is a vertical transverse sectional view of the invention taken on the line 4—4 of Figure 3; and Figure 5 is a fragmentary view similar to Figure 4 showing a modified form of the invention.

Figure 1:
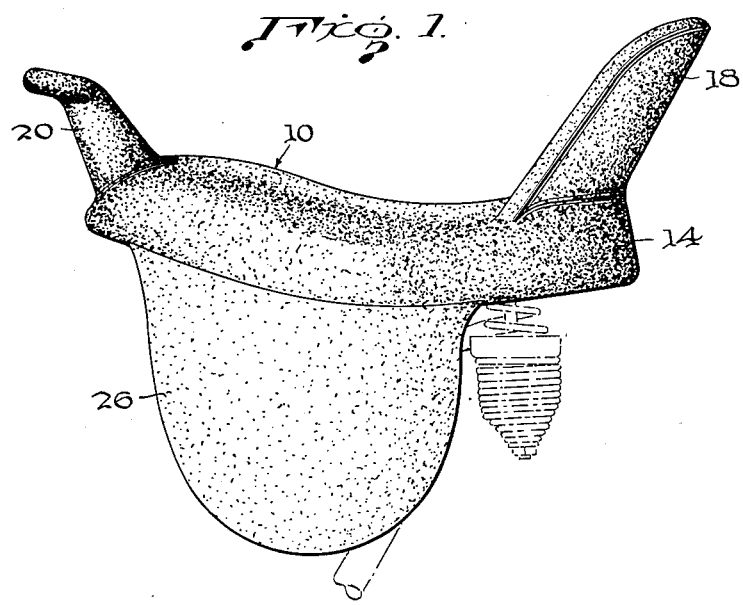
Figure 1 is a side elevational view of the invention.

Referring to the drawings, numeral 10 designates the saddle cover which is preferably of molded rubber construction or other flexible composition in which the safety features comprising the present invention are so embodied as to enable the cover to simulate a cowboy saddle and hence appeal to children.

The cover 10 is molded so that its bottom surface conforms closely with the upper surface of a conventional cycle saddle 12 and is retained in position upon the saddle 12 by means of a depending hard-rubber peripheral flange 14 having an upturned saddle periphery engaging flange 16 both of which are integral with the cover.

A secure seat for a rider is obtained by providing a hard-rubber, upwardly and rearwardly inclined cantle 18 which is also arcuate to conform to the small of the back; by providing a soft rubber horn 20 on the forepart of the saddle cover; by providing a narrow front cover portion 22 to permit free use of the legs in pedalling; and a wide, soft-rubber rear cover portion 24 to form a substantial cushioned seating area. A pair of skirt portions 26 depend from each side of the cover 10 to add to the simulation of a cowboy saddle.

It is to be understood that the term soft rubber is intended to mean flexible rubber of good cushioning characteristics while hard rubber is intended to indicate flexible rubber of lesser cushioning characteristics but greater strength and wear-ability.

The horn 20 is of much shorter height proportionately than its prototype and being of soft rubber could not function as a real horn. The horn 20 is, however, highly important as it positions and helps to maintain a rider in proper position upon the cover 10 of the saddle 12. It is believed obvious that the wide cover portion 24 together with the horn 20 and the back 18 act to relatively confine a rider securely upon the saddle and eliminate the danger of sliding therefrom.

The horn 20 has two additional important functions. When a rider has time to realize that his cycle is about to collide with an object, he may quickly grasp the horn with one hand to lift himself upwardly and rearwardly of the saddle cover to land safely on his feet. When a collision is had without the rider having had time to dismount rearwardly as described, the horn, being of soft rubber and having a gentle upward inclination, will cushion the blow and prevent injury to the rider while resisting the tendency to slide forwardly.

As stated, the horn 20 and the wide rear cover portions 24 are of soft rubber for cushioning purposes while the remaining portions of the cover 10 are of relatively harder (although flexible) rubber for purposes of strength and long wear.

The saddle cover 10 is readily applied to a conventional saddle by starting at the rear and engaging the upturned flange 16 about the periphery of the seat 12 and continuing to temporarily distort the flange for this purpose about the entire seat periphery, ending at the horn 20. To readily remove the saddle cover 10, this process is reversed. It should be noted that the engagement of the relatively hard rubber flange 16 with the entire periphery of the cycle seat is ample to hold the seat cover securely in place although the latter is further secured by the weight of a rider and the friction between the rubber and the seat.

Figure 2:
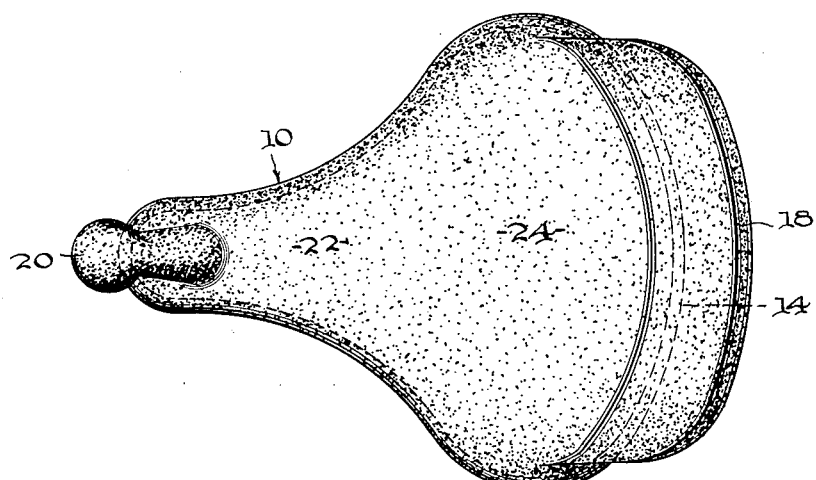
Figure 2 is a top plan view thereof.

As shown in Figure 5, the entire saddle cover 10 may be molded of soft rubber and flexible strengthening inserts 28 such as fabrics, wires, etc. may be used for strength in the areas designated in Figures 1-4 inclusive as being of flexible hard rubber.

It will now be apparent that the saddle cover comprising the invention provides important safety features resulting in the rider having a sure, secure seat, a cushioning member to prevent pelvic injuries in case of collision, and a safety hand-hold to facilitate instant dismounting to avoid collision. Moreover, the saddle cover may be readily applied to conventional cycle saddles or removed therefrom while more efficient pedalling of the cycle is also effected due to the secure seat of the rider.

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:

1. An attachment for cycle saddles comprising a body having a narrow front portion, means projecting from and integral with the front and rear portions of said body and cooperating therewith to form a relatively confined seat for cycle pedalling, and resilient means integral with the periphery of said body portion for engaging the periphery of a cycle saddle and securing the cover thereto.

2. An attachment for cycle saddles comprising a body having a narrow front portion, a curved cantle projecting from the rear of said body, a horn projecting from said front portion, said body, cantle and horn cooperating to form a relatively confined seat for cycle pedalling, and means for securing said body to said cycle seat.

3. An attachment for cycle saddles comprising a body having a narrow front portion, a curved candle projecting from the rear of said body, a horn projecting from said front portion, said body, cantle and horn cooperating to for a relatively confined seat for cycle pedalling, and means for securing said body to said cycle seat, said horn comprising a hand-hold for assisting riders to dismount rearwardly from said saddles.

4. An attachment for cycle saddles comprising a body having a narrow front portion, a curved cantle projecting from the rear of said body, a horn projecting from said front portion, said body, cantle and horn cooperating to form a relatively confined seat for cycle pedalling, and means for securing said body to said cycle seat, said horn being formed of soft resilient material to act as a forward cushioning means in collisions.

5. An attachment for cycle saddles comprising a molded rubber body having a narrow front portion and a wide rear portion, a hand-hold projecting from said front portion and a curved back support projecting from said rear portion, said body, hand-hold and support cooperating to form a relatively confined seat for cycle pedalling, and flanges integral with the periphery of said body for securing the cover to the saddle.

6. An attachment for cycle saddles comprising a molded rubber body having a narrow front portion and a wide rear portion, a hand-hold projecting from said front portion and a curved back support projecting from said rear portion, said body, hand-hold and support cooperating to form a relatively confined seat for cycle pedalling, and flanges integral with the periphery of said body for securing the cover to the saddle, said hand-hold and said rear body portion being of softer rubber than the other portions of the cover.

7. An attachment for cycle saddles comprising a molded rubber body having a narrow front portion and a wide rear portion, a hand-hold projecting from said front portion and a curved back support projecting from said rear portion, said body, hand-hold and support cooperating to form a relatively confined seat for cycle pedalling, and flanges integral with the periphery of said body for securing the cover to the saddle, all of the portions of said cover being of harder rubber than said hand-hold and said rear body portion.

8. An attachment for cycle saddles comprising a soft rubber body having a narrow front portion and a wide rear portion, a hand-hold projecting from said front portion and a curved back support projecting from said rear portion, said body, hand-hold and support cooperating to form a relatively confined seat for cycle pedalling, flanges integral with the periphery of said body for securing the cover to the saddle, and flexible, stiffening inserts in all the portions of said cover except said hand-hold and said rear body portion.

9. An attachment for cycle saddles comprising a flexible body simulating a cowboy saddle including horn, cantle and skirts, the horn and cantle cooperating to form a relatively confined seat for cycle pedalling, and means for securing said body to the cycle saddle.

10. An attachment for cycle saddles comprising a rubber body simulating a cowboy saddle including horn, cantle and skirts, the horn and cantle cooperating to form a relatively confined seat for cycle pedalling, and means for securing said body to the cycle saddle, said horn being of relatively soft rubber.

CLARENCE J. RUPPERT.

REFERENCES CITED

The following references are of record in the file of this patent:

UNITED STATES PATENTS

| Number | Name | Date |
|---|---|---|
| 409,848 | Lewis | Aug. 27, 1889 |
| 559,199 | Padgitt | Apr. 28, 1896 |
| 1,322,959 | Sawasaki | Nov. 25, 1919 |